Oct. 26, 1954

O. BRUMMER 2,692,787

FLUID SEALING MEANS

Filed Jan. 8, 1951

Inventor:
Olin Brummer
By: Jones, Tesch + Darbo
Attys

Patented Oct. 26, 1954

2,692,787

UNITED STATES PATENT OFFICE 2,692,787

FLUID SEALING MEANS

Olin Brummer, Chicago Heights, Ill.

Application January 8, 1951, Serial No. 204,960

2 Claims. (Cl. 288—11)

This invention relates to fluid sealing means for relatively rotatable parts, more particularly shafts and their bearings, employed in connection with pumps for the circulation of water for automotive engine cooling purposes.

In my prior Patent No. 2,408,909, issued October 8, 1946, I disclosed a seal for this purpose which was adapted for sealing at one end against the pump impeller hub and not directly on the shaft itself, it being there contemplated that the impeller hub have a press fit on the shaft which would provide a seal between the impeller hub and the shaft. In some instances, it may be desirable to have the impeller hub fit the shaft somewhat loosely and be held thereto by a pin or set-screw, in which case the fit of the hub on the shaft may not be such as to effect a seal.

In accordance with my present invention, I disclose a seal of the type shown in my said prior patent but which incorporates provision for sealing preferably both against the impeller hub and against the shaft itself, so that even though the impeller hub does not itself effect a seal with the shaft, the seal of my present invention will do so, while at the same time also, if desired, effecting a seal against the impeller hub, as well as bearing against the shaft bearing.

The desired results just referred to are achieved by the markedly simple but efficient structure herein disclosed.

These and other objects and advantages will be apparent from the following description, taken together with the accompanying drawings, of an illustrative embodiment of the invention, and in which drawings—

Figure 1:
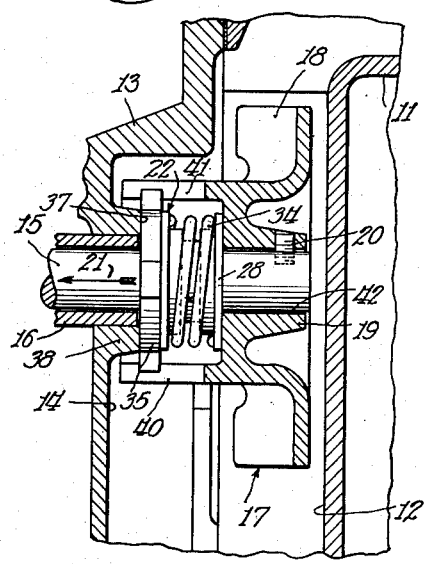
Figure 1 is a sectional view through an illustrative pump construction showing my improved sealing means in elevation and in sealing position.
Figure 2:
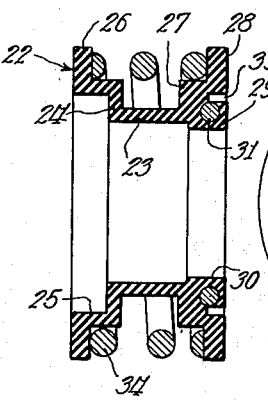
Figure 2 is an enlarged axial sectional view of parts shown in Fig. 1, the rubber boot or body being uncompressed.

Referring in detail to the illustrative construction shown in the drawings, the numeral 11 may represent a portion of the engine block of an internal combustion engine which may be jacketed as by the passage 12 for the circulation of a coolant such as water or the like. The pump casing 13 may be suitably secured to the engine block and may have an orifice 14 which communicates with the radiator of the power plant. Extending through the pump casing is a shaft 15 rotatable in a bushing 16 carried by the pump casing 13. Secured on the shaft 15 to rotate therewith is the impeller 17 having blades 18 which revolve in the passage 12 to cause the water to circulate therein from and to the radiator. The impeller 17 has a hub 19 which in this instance may be somewhat loose on the shaft 15 and may be keyed thereto to rotate therewith by any suitable means such as, for example, a set-screw 20. It is desired to prevent leakage of water along the shaft 15 in the direction of the arrow 21 outwardly of the shaft, i. e., in the direction of the mechanism for rotating the shaft (not shown).

In accordance with the present invention, the fluid sealing means herein disclosed embodies an annular body 22 of elastomeric material, natural rubber or preferably a suitable synthetic rubber-like material which is resistant to heat and cold. The body 22, as here shown, has an intermediate distortable section represented in this instance by the central tubular part 23, diaphragm-like part 24, and cylindrical part 25. At one end the distortable section terminates in an enlarged formation and in this instance the radially enlarged end flange 26.

Figure 3:
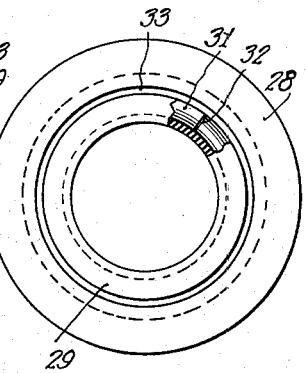
Figure 3 is an end view of the structure shown in Fig. 2.
Figure 6:
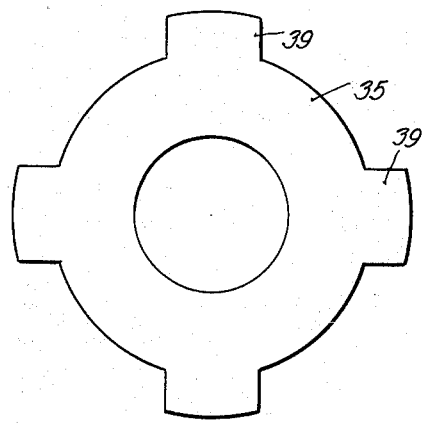
Figure 6 is an end view of the sealing washer on the scale of Fig. 4.
Figure 4:
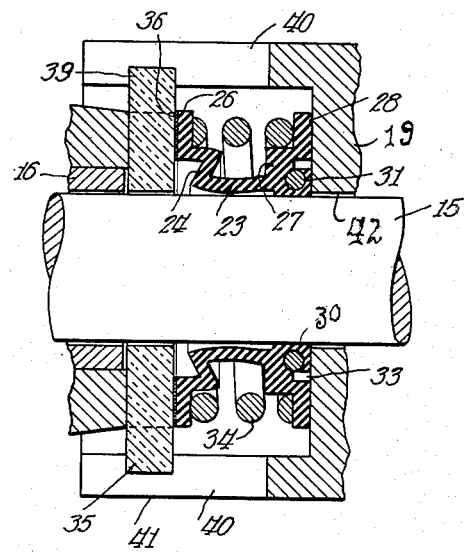
Figure 4 is a partial view somewhat similar to Fig. 1 but on a larger scale, with parts shown in section.

Further in accordance with the present invention, at its other end, the body tubular part 23 terminates in an enlarged formation 27. The formation 27, following the present invention has two axially directed portions, one the portion 28 which is in the nature of an end flange, and the other the portion 29, which is adapted to grip the shaft 15 and has a cylindrical surface 30 which may be preloaded or press-fitted onto the shaft. Carried by the portion 29, still further following the present invention, is a metallic reinforcing or loading ring 31 which is here shown in the form of a split spring ring having ends almost meeting as at 32 (Fig. 3). The ring is preferably molded in integrally with the rubber.

Desirably, the portions 28 and 29, at this face end of the seal, are separated by an annular slot or groove 33, this slot is shown being as deep as the flange 28 is thick; thus leaving a weakened portion between the flange 28 and portion 27.

Between the flanges 26 and 28 is disposed a compression coil spring 34 which resists compression of the body 22. The outer faces of the cylindrical section 25 and 27 provide seats for the end coils of the spring 34 respectively.

Figure 5:
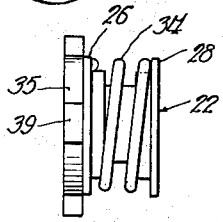
Figure 5 is a view of the present unitary sealing means itself on the scale of Fig. 1, but again with the rubber boot uncompressed.

Desirably, the sealing washer 35, which may be of anti-friction material such as a phenolic condensation product impregnated with graphite, for example, may be suitably glued or cemented as at 36 to the face of the flange 26, so that, as shown in Fig. 5, the sealing means is a unitary self-contained device adapted to be placed in the pump on the shaft 15 in only one way so as to avoid misplacement. It will be understood that the device shown as a unit in Fig. 5 is pressed onto shaft 15, the internal diameter of the cylindrical face 30 being preferably initially just slightly smaller than the shaft. This desirably causes a slight expansion of the spring ring 31 which thereupon tends to contract and to assist the rubber section 29 in gripping the shaft along the cylindrical surface 30, to effect a fluid-tight seal thereat between the shaft and the rubber body 22 by pressure in an inwardly radial direction. At the same time, the flange 28 of the body is pressed by the spring 34 against the hub 19 of the impeller 17, effecting a further fluid-tight seal at that point by independent pressure in an axial direction. The sealing means rotates with the shaft.

At the other end of the sealing device, the sealing washer 35, which has a ground or lapped outer face, abuts a similarly ground or lapped annular face 37 in the pump casing 13 on the part thereof which provides the bearing 38 for the shaft, thus effecting a close rotative engagement which prevents or reduces to a minimum fluid leakage at this point. Lugs 39 spaced circumferentially of the sealing washer 35 are received in slots 40 in a sleeve-like extension 41 of the impeller 17 to insure that the sealing device will turn with the shaft and to relieve the torque upon the shaft-gripping annular portion 29.

It will be understood that the device is installed under compression and that as the sealing washer wears at 37, the spring 34 expands the parts to compensate for the wear and to keep the seal. So constructed and arranged, an efficient seal is effected whether or not the impeller hub makes a sealing connection with the shaft, and, in this instance, specifically, where the impeller hub may be somewhat loose on the shaft as at 42, thus facilitating installation and repair of water pumps for automobiles and the like with a minimum of time, labor and equipment expense.

Since the body portions 28 and 29 are in the same radial plane, and the spring ring 31 is also in this plane, space is conserved and the uncompressed or free height of the sealing device is not lengthened, the device thus adapting itself to the same seal space presently provided in pump constructions for which the invention is adapted.

By reason of the separation of the annular parts 28 and 29, as by the annular groove or slot 33, the parts 28 and 29 are flexible independently of each other the one axially and the other radially while still being in the same radial plane, thus further enhancing the efficiency of the device.

The invention is not intended to be limited to details of construction shown for purposes of exemplification and such changes may be made as fall within the scope of the appended claims without departing therefrom.

The invention having been described, by reference to a specific embodiment, what is here claimed is:

1. In fluid sealing means embodying an annular body of elastomeric material having an intermediate distortable section and enlarged end formations, that improvement wherein one of said formations comprises a main portion and axially outwardly offset portions, one of said offset portions constituting a radially deflectable element and the other said offset portion constituting an axially deflectable end flange, there being an axially extending annular slot between said element and said flange, said slot being substantially as deep as the flange is thick to leave a weakened section between the flange and the main portion, whereby the element and flange are independently deflectable radially and axially respectively, a metallic loading ring embedded in said element, and a coil spring surrounding the distortable section between said end formations and pressing at one end against said flange to urge the flange axially, said ring and said spring being on radially opposite sides of said slot.

2. In fluid sealing means embodying an annular body of elastomeric material for encircling a shaft and having an intermediate distortable section and radially enlarged end formations, that improvement wherein one of said formations comprises a main portion and axially outwardly offset portions, one of said offset portions constituting a radially deflectable element for gripping the shaft and the other said offset portion constituting an axially deflectable end flange, there being an axially extending annular slot between said element and said flange, said slot being substantially as deep as the flange is thick to leave a weakened section between the flange and the main portion, whereby the element and flange are independently deflectable radially and axially respectively, and a coil spring surrounding the distortable section compressed between said end formations and pressing at one end against said flange to urge the flange axially while the said element grips the shaft.

References Cited in the file of this patent

UNITED STATES PATENTS

| Number | Name | Date |
|---|---|---|
| 2,167,986 | Lignian et al. | Aug. 1, 1939 |
| 2,299,638 | Marvin | Oct. 20, 1942 |
| 2,403,298 | Payne | July 2, 1946 |
| 2,408,909 | Brummer | Oct. 8, 1946 |
| 2,556,133 | Bright | June 5, 1951 |

FOREIGN PATENTS

| Number | Country | Date |
|---|---|---|
| 574,619 | Great Britain | Jan. 14, 1946 |